Dec. 14, 1926.  
J. B. FREYSINGER  
ESCUTCHEON  
Filed May 2, 1924  
1,611,015
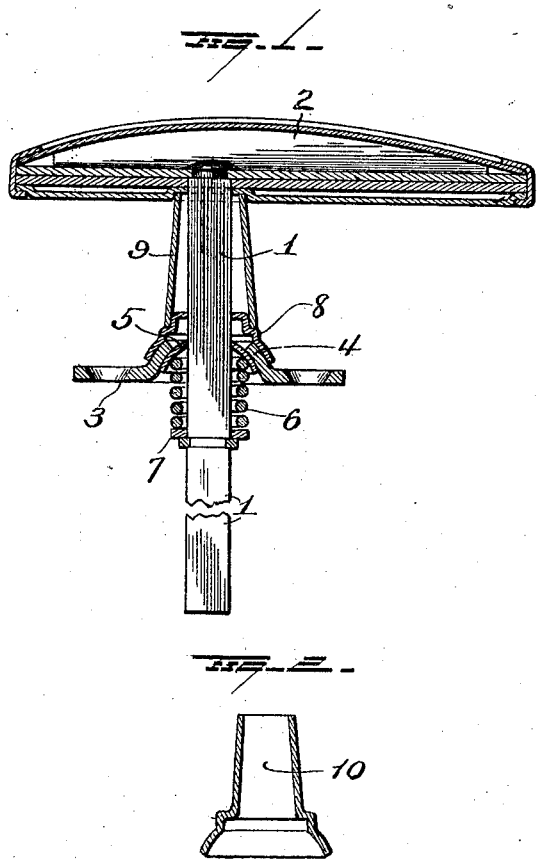
Inventor  
J. B. Freysinger  
By Seymour & Bright  
Attorneys Patented Dec. 14, 1926.

1,611,015

UNITED STATES PATENT OFFICE.

JOHN B. FREYSINGER, OF NEW BRITAIN, CONNECTICUT, ASSIGNOR TO NORTH & JUDD MANUFACTURING COMPANY, OF NEW BRITAIN, CONNECTICUT.

ESCUTCHEON.

Application filed May 2, 1924. Serial No. 710,692.

This invention relates to escutcheons and has for its object the provision of an escutcheon which is adjustable to the angular relation between a door and a lock or lock latch spindle passing through the door. The invention is illustrated in the accompanying drawing and resides in certain novel features which will be hereinafter first fully described and then more particularly pointed out in the appended claims.

In the drawing, Figure 1 is a sectional view through an escutcheon plate and spindle mounting embodying the present invention;

Figure 2 is a detail section showing a slight modification.

The lock or latch spindle 1 is of the usual form and has a handle or grip 2 secured upon its outer end. The escutcheon plate 3 is secured upon the door and fits around the spindle, being provided, in accordance with the present invention, with a central outwardly extending projection 4 of a spheroidal form, the escutcheon plate with the projection being stamped from sheet metal. It will be noted that the mouth or opening of this projection is of greater diameter than the spindle so that the spindle may have considerable rocking movement relative to the escutcheon and the device therefore adjusted to any angular relation of the door and the spindle within the limits of such movement. Fitted upon the spindle to move therewith is a spherical washer 5 which fits closely but slidably to the inner or concave side of the projection 4 and is held frictionally to the projection by a spring 6 coiled around the spindle between the washer and an abutment 7. Resting upon the outer side of the projection 4 is a socket 8 which may be closely engaged around the spindle and fitted to and secured in the inner end of a sleeve or tubular stem 9, as shown in Fig. 1, or may be an integral part of the stem, as shown at 10 in Fig. 2. The outer end of the stem seats in the back or scalp plate of the handle 2, as shown at 11.

From the foregoing description, taken in connection with the accompanying drawing, it will be seen that I have provided a very simple and inexpensive swivel or ball and socket joint for escutcheon plates whereby the plate, when being applied to a door, will automatically adjust itself to the angular relation of the door and the spindle. It will be noted that the stem 9 is free of the spindle and need not turn with it, the engagement of the ends of the stem with the scalp plate and the escutcheon being only frictional and due to the expansion of the spring 6. The construction and arrangement of the parts is such that the elements may be readily fashioned from sheet metal and easily assembled and, when assembled, the completed device will have an attractive appearance. The complete handle and spindle assembly may be produced at a very low cost but the device is highly efficient for the purpose for which it is designed and is light and durable, admission of dust between relatively movable parts being very effectually prevented.

Having fully described my invention what I claim as new and desire to secure by Letters Patent, is:—

1. The combination of an escutcheon plate having an outwardly projecting spherical portion provided with a central opening therethrough, a spindle passing through the opening in the projection, a handle secured on the outer end of the spindle, a socket fitting over the spherical projection around the spindle, a tubular stem extending between the socket and the handle with its outer end seating in the back of the handle and free of spindle, and means carried by the spindle at the inner side of the projection on the escutcheon plate for holding the socket to the projection and the outer end of the stem in frictional engagement with the back of the handle.

2. The combination of an escutcheon plate having a spherical projection on its outer side with on opening therethrough, a spindle passing through the opening in said projection, a handle secured on the outer end of the spindle, a tubular stem extending inwardly from the handle around the spindle and free of the spindle, a socket at the inner end of the stem resting over the projection on the escutcheon, a spherical washer carried by the spindle and seating on the inner side of said projection, and a spring carried by the spindle and acting between the same and the washer to hold the washer and the socket in frictional engagement with the spherical projection, and the outer end of the stem in frictional engagement with the handle.

In testimony whereof, I have signed this specification.

JOHN B. FREYSINGER.